(12) United States Patent
Lange

(10) Patent No.: US 7,191,912 B2
(45) Date of Patent: Mar. 20, 2007

(54) BRAKE FLUID RESERVOIR WITH IMPROVED VENTING

(75) Inventor: Hans-Christoph Lange, Nörtershausen (DE)

(73) Assignee: Lucas Industries Limited (GB)

( * ) Notice: Subject to any disclaimer, the term of this patent is extended or adjusted under 35 U.S.C. 154(b) by 52 days.

(21) Appl. No.: 10/132,990

(22) Filed: Apr. 26, 2002

(65) Prior Publication Data

US 2002/0121806 A1   Sep. 5, 2002

Related U.S. Application Data

(63) Continuation of application No. PCT/EP00/09815, filed on Oct. 6, 2000.

(30) Foreign Application Priority Data

Oct. 29, 1999   (DE) ................. 199 52 336

(51) Int. Cl.
*B65D 51/16* (2006.01)
*B60T 11/26* (2006.01)
*B60T 11/34* (2006.01)
*B60T 11/10* (2006.01)

(52) U.S. Cl. ............... 220/303; 220/86.2; 220/203.28; 220/368; 220/374

(58) Field of Classification Search .............. 220/303, 220/562, 367.1, 368, 373, 374, 203.03, 203.27, 220/203.28, 203.29, 86.2
See application file for complete search history.

(56) References Cited

U.S. PATENT DOCUMENTS

| 1,467,706 | A | * | 9/1923 | Collins | 220/374 |
| 2,918,192 | A | * | 12/1959 | Dedman | 220/374 |
| 4,036,393 | A | * | 7/1977 | Neiman | 220/203.05 |
| 4,693,393 | A | * | 9/1987 | DeMinco et al. | 220/374 |
| 4,795,052 | A | * | 1/1989 | Hayes, Jr. | 220/711 |
| 4,909,409 | A | * | 3/1990 | Shreve | 220/374 |
| 5,086,943 | A | * | 2/1992 | Poskie | 220/374 |

FOREIGN PATENT DOCUMENTS

| DE | 3122085 | 3/1982 |
| DE | 3734421 | 4/1989 |
| EP | 153428 | 9/1985 |
| GB | 2115528 | 9/1983 |

* cited by examiner

*Primary Examiner*—Anthony D. Stashick
*Assistant Examiner*—Niki M. Eloshway
(74) *Attorney, Agent, or Firm*—MacMillan, Sobanski & Todd, LLC

(57) ABSTRACT

A brake fluid reservoir (10) for a vehicle hydraulic brake system has a filler neck (16), a lid (18) which closes the filler neck, and a device for pressure compensation between the reservoir interior and the ambient atmosphere. In order, when the brake fluid reservoir (10) is in a steeply inclined position, to prevent an escape of brake fluid, in the lid (18) a first brake fluid forced-flow channel (32) is formed, which has an inlet (34) at the inside of the lid and an outlet (36) towards the outside of the lid. The forced-flow channel (32) extends between the inlet (34) and the outlet (36) along a curved path, which in relation to a plan view of the lid (18) runs through at least two quadrants.

9 Claims, 2 Drawing Sheets

BRAKE FLUID RESERVOIR WITH IMPROVED VENTING

CROSS REFERENCE TO RELATED APPLICATIONS

This application is a continuation of International Application No. PCT/EP00/09815 filed Oct. 6, 2000, which claims priority to German Patent Application No. 19952336.3 filed Oct. 29, 1999, the disclosures of which are incorporated herein by reference.

The invention relates to a brake fluid reservoir for a vehicle hydraulic brake system. Such a brake fluid reservoir is known from DE 31 22 085 A1.

BACKGROUND OF THE INVENTION

Vehicle hydraulic brake systems comprise a brake fluid reservoir, which is usually seated on the master cylinder of the vehicle brake system and connected by means of two couplings in a fluid-conducting manner to the master cylinder. Hydraulic fluid, which is needed to balance the fluid content of the brake system, flows from said brake fluid reservoir into the brake system. Surplus brake fluid moreover flows from the brake system into the brake fluid reservoir. The brake fluid reservoir is accordingly used to provide a spare or buffer volume of brake fluid.

Because of the described flow of brake fluid into and out of the brake fluid reservoir, the pressure in the brake fluid reservoir may alter. Generally, and also according to DE 31 2 085 A1, a venting or pressure compensating device is therefore provided, usually on the filler neck of the brake fluid reservoir and on the lid cooperating therewith. Said venting and/or pressure compensating devices are designed for normal vehicle operation.

However, especially in the all-terrain vehicles recently being purchased in increasing numbers, the problem arises that brake fluid may escape from the brake fluid reservoir via the pressure compensating device when the vehicle is in a steeply inclined position. An escape of brake fluid is extremely undesirable because the brake fluid is highly inflammable and may therefore lead to a fire under certain circumstances, e.g. if escaping brake fluid drips onto hot engine parts, e.g. onto the exhaust manifold. Even if said risk did not exist, no brake fluid should escape from the brake fluid reservoir because brake fluid is toxic and harmful to the environment.

SUMMARY OF THE INVENTION

The object of the invention is to indicate a brake fluid reservoir, from which no brake fluid escapes even in the event of a steeply inclined position being maintained for a specific time.

Proceeding from the initially described conventional brake fluid reservoir, said object is achieved according to the invention in that in the lid a first brake fluid forced-flow channel is formed, which has an inlet at the inside of the lid and an outlet towards the outside of the lid and which between the inlet and the outlet extends along a curved path, which in relation to a plan view of the lid runs through at least two quadrants.

In said manner a direct escape of brake fluid through the lid is avoided because the brake fluid first has to pass through the curved path, which extends through at least two quadrants in the lid, before reaching the outside of the lid. The curvature of the path may be selected differently but always in such a way that makes it difficult for brake fluid to escape. Even if the possibility of a brake fluid escape is riot entirely ruled out according to the invention, it is however made difficult enough for there to be no escape of brake fluid during the length of time that a vehicle is usually situated in a steeply inclined position. The forced-flow channel provided according to the invention in the lid is a more or less highly developed labyrinth, which may be overcome by the brake fluid only after some delay.

In one form of construction, the curved path follows a circular route. Said circular route may extend from the inlet to the outlet via two quadrants and thus forms a semicircle, though it may also extend over three or four quadrants so that the brake fluid has to travel through an angle of approximately 360 degrees in the lid if it is to pass from the inlet of the first forced-flow channel to the outlet of the latter.

According to a preferred refinement of the brake fluid reservoir according to the invention, the first forced-flow channel is formed in the underside of the lid and is open along its curved route towards the reservoir interior. In said refinement, the first forced-flow channel is delimited only partially by the lid. Disposed between the lid and the filler neck in said form of construction is a sealing washer, which closes off the first forced-flow channel towards the reservoir interior and leaves only the inlet of the first forced-flow channel clear. The channel wall is accordingly formed, on the one hand, by the material of the lid and, on the other hand, by the sealing washer. Because the first forced-flow channel in said refinement is open towards the reservoir interior, it is easy to manufacture, e.g. by moulding into the lid.

In a modification of the embodiment just described, a rod-shaped extension extends from the underside of the lid directed towards the reservoir interior, through the sealing washer into the reservoir interior. In said form of construction, the sealing washer is annular and also closes off the inlet of the first forced-flow channel towards the reservoir interior. The rod-shaped extension has in its lateral surface at the level of the sealing washer a recess, which connects the inlet of the first forced-flow channel to the reservoir interior. In other words, the recess creates a fluid connection, which leads past the sealing washer radially at the inside, between the reservoir interior and the inlet of the first forced-flow channel. The sealing washer accordingly need not be specially designed to keep the inlet open. Furthermore, the recess in the lateral surface of the rod-shaped extension provides an improved labyrinth effect, which makes it even more difficult for brake fluid to escape from the brake fluid reservoir.

In order to reduce still further the probability of an escape of brake fluid from the brake fluid reservoir, according to a development of the brake fluid reservoir according to the invention in the lid above the first forced-flow channel a second brake fluid forced-flow channel having an inlet and an outlet is formed, which between the inlet and the outlet extends along a curved path, which in relation to a plan view of the lid runs through at least two quadrants. In said form of construction, the inlet of the second forced-flow channel is connected to the outlet of the first forced-flow channel, while the outlet of the second forced-flow channel is connected to the ambient atmosphere.

The ability of the lid to prevent an escape of brake fluid is once more markedly increased by the second forced-flow channel. As both channels extend over at least two quadrants, the brake fluid in said form of construction has to run through at least all four quadrants once if it is to pass from the inlet of the first forced-flow channel to the outlet of the second forced-flow channel.

In preferred embodiments, the second forced-flow channel also follows a circular route. Preferably, the second forced-flow channel extends through all four quadrants.

In a similar manner to that described in connection with the first forced-flow channel, according to a preferred embodiment the second forced-flow channel is formed in the top side of the lid and along its curved path is open towards the ambient atmosphere. A lid cap connected to the lid completes the second forced-flow channel and closes it off, apart from the outlet, towards the ambient atmosphere. The lid cap may in said case be designed in such a way that its surface directed towards the lid is continuously flat, although a part of the second forced-flow channel may alternatively be formed in the surface of the lid cap directed towards the lid. For example, the separating plane between the lid and the lid cap may divide the second forced-flow channel horizontally so that one half of the second forced-flow channel is formed in the lid and the other half of the second forced-flow channel is formed in the lid cap. The lid cap is preferably welded or glued to the lid. Said types of connection are particularly appropriate when the lid and the lid cap are made of plastics material.

In preferred forms of construction of the brake fluid reservoir according to the invention, the outlet of the second forced-flow channel is connected to the ambient atmosphere by an at least substantially upwardly extending outlet bore of a defined height. Said outlet bore, which is formed in the lid or optionally in the lid cap, once more represents a resistance to the brake fluid, which has to be overcome before an escape may occur. By selecting the height of the outlet bore, i.e. by selecting the extent to which the outlet bore extends substantially upwards, said resistance may be set higher or lower, depending on requirements.

In all embodiments the dimension of the cross section of the channels is preferably such that no capillary action occurs in the channels. Brake fluid, which has passed into the channels, may therefore automatically flow back into the brake fluid reservoir once the latter is no longer in the inclined position.

DETAILED DESCRIPTION OF THE INVENTION

Figure 1:
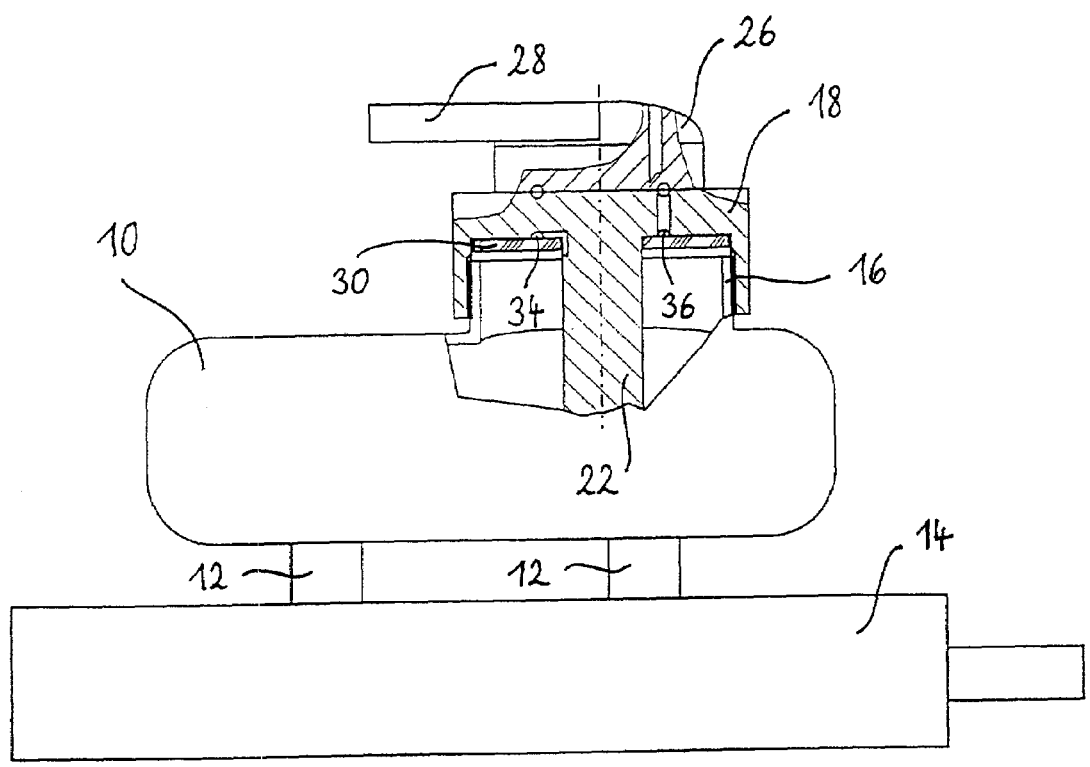
FIG. 1 a part-sectional side view of a brake fluid reservoir according to the invention, which is mounted on a master cylinder, FIG. 2 an enlarged sectional view of the region of the filler neck and the lid of the brake fluid reservoir illustrated in FIG. 1, FIG. 3 the section III—III from FIG. 2, and FIG. 4 the section IV—IV from FIG. 2.

FIG. 1 shows a brake fluid reservoir 10 of a vehicle hydraulic brake system, which reservoir is connected in a fluid-conducting manner by two couplings 12 extending from its underside to an only diagrammatically reproduced master cylinder 14. As millions of such brake fluid reservoirs are in use, their function is known to experts in the present field and requires no further explanation here.

The reservoir 10 is made of transparent plastics material and has, formed on its top side, a filler neck 16 having an external thread. Screwed onto the filler neck 16 is a substantially round lid 18, which is provided with an internal thread and closes the opening of the filler neck 16.

Figure 2:
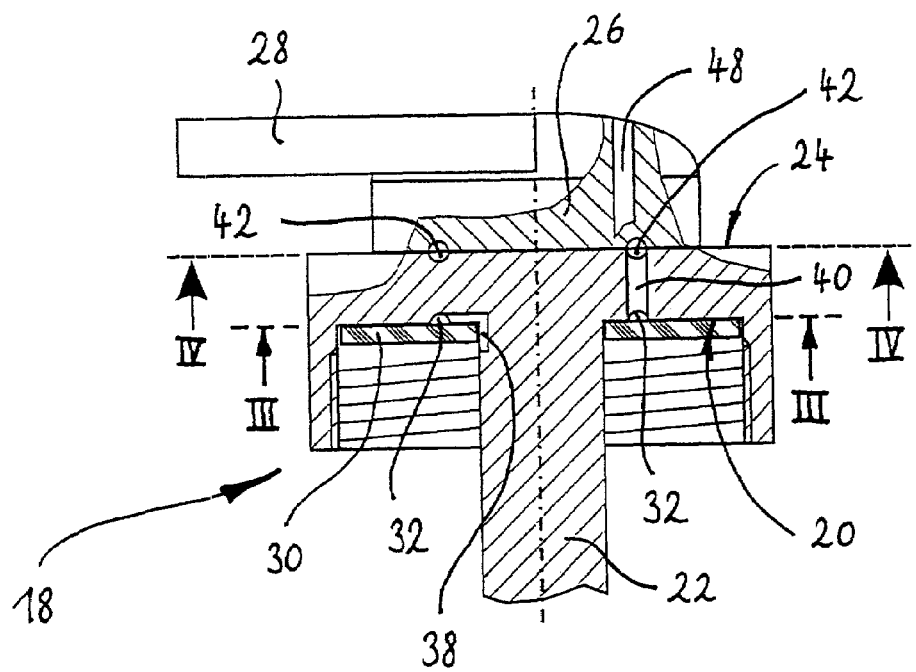
Figure 3:
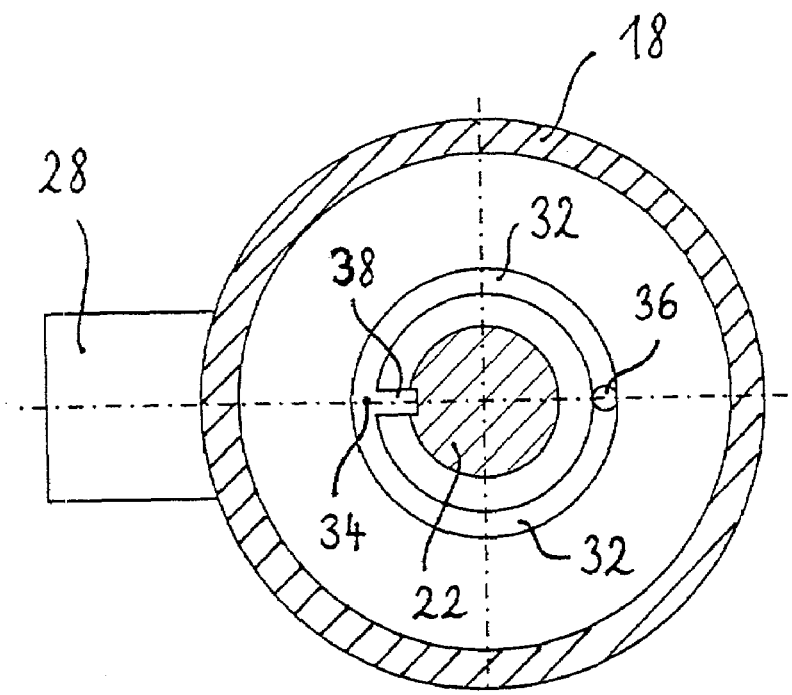
Figure 4:
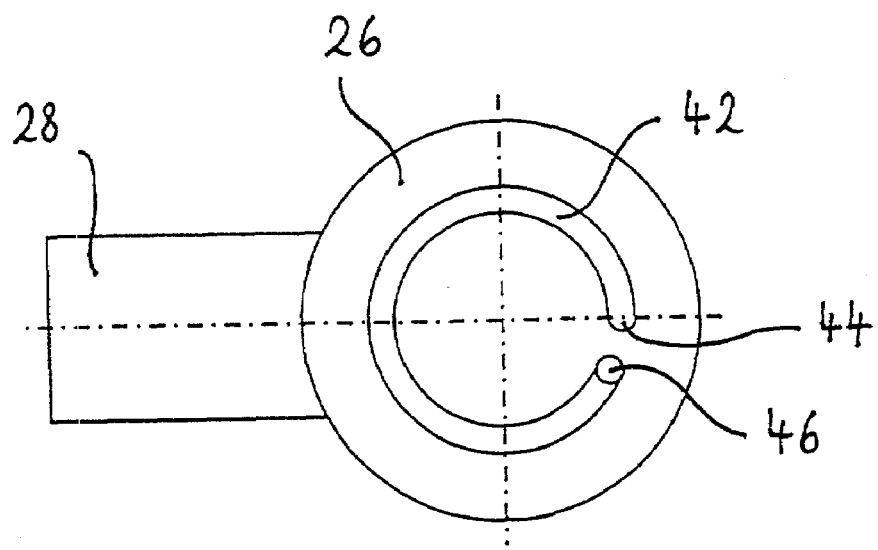

The lid 18, which is shown in greater detail in FIGS. 2 to 4, is made of plastics material and has an underside 20, from which a rod-shaped extension 22 extends into the reservoir interior. Extending through the extension 22 is a sensor device, which is not illustrated here and which detects the fluid level in the reservoir 10 and, if the fluid level is too low, supplies a signal to a warning device, which is likewise not illustrated.

The lid 18 moreover has a top side 24, on which a cap 26 likewise made of plastics material is fastened by welding to the lid 18. The lid cap 26 is provided with a radially extending extension 28, which is designed as a plug connector (not shown) and used to connect the previously mentioned sensor device.

Disposed axially between the lid 18 and the filler neck 16 is an annular sealing washer 30, which is supported against the underside 20 of the lid 18 and, when the lid 18 is screwed down, is pressed against the end face of the filler neck 16 in order to seal the latter. In order, when the lid 18 is screwed down, to enable a pressure compensation between the interior of the reservoir 10 and the ambient atmosphere and at the same time prevent an escape of brake fluid from the reservoir 10 through the filler neck 16 or the lid 18, a first forced-flow channel 32 for brake fluid is formed in the underside 20 of the lid 18. As is clearly visible in FIG. 3, the first forced-flow channel 32 in the embodiment shown here is circular and has an inlet 34 and an outlet 36. The outlet 36 is situated exactly opposite the inlet 34 so that brake fluid passing through the inlet 34 into the first forced-flow channel 32 may flow either in clockwise or anticlockwise direction in the forced-flow channel 32 in order to reach the outlet 36. In either case, the brake fluid has to follow a semicircular path extending through two quadrants.

In the illustrated embodiment the first forced-flow channel 32, which at its underside is initially open towards the interior of the reservoir 10, is closed off by the sealing washer 30, i.e. one wall of the first forced-flow channel 32 is formed by the sealing washer 30. As a whole, the second forced-flow channel 32 therefore has a semicircular cross section. In order to connect the inlet 34 of the first forced-flow channel 32 to the interior of the brake fluid reservoir 10, in the lateral surface of the rod-shaped extension 22 at the level of the sealing washer 30 a recess 38 is provided, the axial extension of which is greater than the thickness of the sealing washer 30. The recess 38 continues in the underside 20 of the lid 18 in radial direction as far as the inlet 34.

From the outlet 36 of the first forced-flow channel 32 an outlet line 40 leads through the lid 18 to the top side 24 of the latter.

In order to make an escape of brake fluid even more difficult, in the illustrated embodiment a second forced-flow channel 42 for brake fluid having an inlet 44 and an outlet 46 is formed in the top side 24 of the lid 18. Said second forced-flow channel 42 from its inlet 44 to the outlet 46 follows a circular path through all four quadrants. The outlet 46 is situated adjacent to the inlet 44, i.e. the circle is not quite closed.

In an analogous manner to the first forced-flow channel 32, in the second forced-flow channel 42 only part of the channel wall is formed in the lid 18. The other half of the channel wall is moulded in the surface of the lid cap 26 directed towards the top side 24 of the lid 18. As a whole, the second forced-flow channel 42 therefore has a circular cross section.

The inlet 44 of the second forced-flow channel 42 is connected by the outlet line 40 to the outlet 36 of the first forced-flow channel 32. Adjoining the outlet 46 of the second forced-flow channel 42 is an outlet bore 48, which leads upwards through the lid cap 26 and connects the second forced-flow channel 42 to the ambient atmosphere. The height of the outlet bore 48, i.e. its extension in axial direction, is so selected that an escape of brake fluid is reliably avoided in given operating conditions (inclined position, duration of inclined position, etc.).

Given a steeply inclined position of the brake fluid reservoir 10, e.g. 45 degrees, brake fluid would have to pass through the recess 38 in the rod-shaped extension 22 into the first forced-flow channel 32 and, there, run through a loop of 180° before being able to pass through the outlet line 40 into the second forced-flow channel 42. In the second forced-flow channel 42 the brake fluid would then have to run through a circular path of approximately 360° and subsequently overcome the rising height of the outlet bore 48 before there could be an escape of brake fluid into the environment. In practice, it does not come to this because the labyrinth formed in the lid 18 by the first forced-flow channel 32 and the second forced-flow channel 42 represents such a high resistance that, even if an inclined position is maintained for an extended period, an escape of brake fluid does not occur.

In the illustrated embodiment the first forced-flow channel 32 has an effective length extending through 180°, while the second forced-flow channel 42 has an effective length extending through almost 360°. In modified embodiments, the first forced-flow channel 32 may have a greater effective length and the second forced-flow channel 42 may have a smaller effective length. Furthermore, the shape of the channels 32 and 42 is not restricted to the illustrated circular path, rather the channels 32 and 42 may follow different routes, which offer resistance to an escape of fluid.

The cross section of the first and second forced-flow channel is selected large enough to prevent capillary action in the channels. In said manner brake fluid, which has passed into the channels, may automatically flow back into the brake fluid reservoir 10 once the latter is no longer in an inclined position.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Brake fluid reservoir for a vehicle hydraulic brake system, having a filler neck, a lid which closes the filler neck, and a device for pressure compensation between the reservoir interior and the ambient atmosphere, wherein in the lid a first brake fluid forced-flow channel is formed, which has an inlet at the inside of the lid and an outlet towards the outside of the lid and which between the inlet and the outlet extends along a curved path, which in relation to a plan view of the lid runs through at least two quadrants, wherein the outlet is displaced circumferentially from the inlet such that all fluid flowing between the inlet and the outlet is forced through the at least two quadrants, and wherein the outlet is connected to an outlet line, which leads upwards to the outside of the lid;

wherein a second forced-flow channel having an inlet and an outlet is formed in the lid above the first forced-flow channel and extends between the inlet and the outlet along a curved path, which in relation to a plan view of the lid runs through at least two quadrants, wherein the inlet of the second forced-flow channel is connected to the outlet of the first forced-flow channel and the outlet of the second forced-flow channel is connected to the ambient atmosphere.

2. Brake fluid reservoir according to claim 1, wherein the curved path follows a circular route.

3. Brake fluid reservoir according to claim 1, wherein the first forced-flow channel is formed in the underside of the lid and along its curved path is open towards the reservoir interior, and that a sealing washer disposed between the lid and the filler neck closes off the first forced-flow channel, apart from its inlet, towards the reservoir interior.

4. Brake fluid reservoir according to claim 3, wherein the sealing washer also closes off the inlet of the first forced-flow channel towards the reservoir interior, that a rod-shaped extension extends from the underside of the lid, through the sealing washer into the reservoir interior, andthat provided in the lateral surface of the rod-shaped extension at the level of the annular sealing washer is a recess, which connects the inlet of the first forced-flow channel to the reservoir interior.

5. Brake fluid reservoir according to claim 1, wherein the curved path of the second forced-flow channel follows a circular route and extends trough four quadrants.

6. Brake fluid reservoir according to claim 1, wherein second forced-flow channel is formed in the top side of the lid and along its curved path is open towards the ambient atmosphere, and that a lid cap connected to the lid completes the second forced-flow channel and closes off the latter, apart from the outlet, towards the ambient atmosphere.

7. Brake fluid reservoir according to claim 6, wherein the lid cap is welded or glued to the lid.

8. Brake fluid reservoir according to claim 1, wherein the outlet of the second forced-flow channel is connected to the ambient atmosphere by an at least substantially upwardly extending outlet bore of a defined height.

9. Brake fluid reservoir according to claim 1, wherein the dimension of the cross section of the forced-flow channels is such that no capillary action occurs in them.

* * * * *